United States Patent
Vankipuram et al.

(10) Patent No.: US 10,503,256 B2
(45) Date of Patent: Dec. 10, 2019

(54) FORCE FEEDBACK

(71) Applicant: Hewlett Packard Enterprise Development LP, Houston, TX (US)

(72) Inventors: Mithra Vankipuram, Palo Alto, CA (US); Gregory W. Cook, Palo Alto, CA (US); Nelson L. Chang, San Jose, CA (US); Joshua Hailpern, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 512 days.

(21) Appl. No.: 15/034,505

(22) PCT Filed: Jan. 29, 2014

(86) PCT No.: PCT/US2014/013531
§ 371 (c)(1),
(2) Date: May 4, 2016

(87) PCT Pub. No.: WO2015/116056
PCT Pub. Date: Aug. 6, 2015

(65) Prior Publication Data
US 2016/0291695 A1    Oct. 6, 2016

(51) Int. Cl.
*G06F 3/01* (2006.01)
*G06F 3/0485* (2013.01)
*G06F 3/0481* (2013.01)
*G06T 11/20* (2006.01)
*G06T 19/00* (2011.01)

(52) U.S. Cl.
CPC .............. *G06F 3/016* (2013.01); *G06F 3/011* (2013.01); *G06F 3/04815* (2013.01); *G06T 11/206* (2013.01); *G06T 19/003* (2013.01)

(58) Field of Classification Search
None
See application file for complete search history.

(56) References Cited

U.S. PATENT DOCUMENTS

| | | | |
|---|---|---|---|
| 6,906,700 B1 | 6/2005 | Armstrong | |
| 7,710,405 B2 | 5/2010 | Keski-Jaskari et al. | |
| 8,127,437 B2 | 3/2012 | Lipton et al. | |
| 2005/0093847 A1* | 5/2005 | Altkorn | G06F 3/016 345/184 |
| 2006/0122819 A1 | 6/2006 | Carmel et al. | |

(Continued)

FOREIGN PATENT DOCUMENTS

| | | |
|---|---|---|
| CN | 202372925 | 8/2012 |
| CN | 203038828 | 7/2013 |

(Continued)

OTHER PUBLICATIONS

Sampo et al, "Low Temperature Solution Processable Electrodes for Piezoeletric Sensors Applications", May 20, 2013.

(Continued)

*Primary Examiner* — Nhat Huy T Nguyen

(57) ABSTRACT

A technique for force feedback can include displaying a data set in a visual model. A technique for force feedback can include selecting a portion of the data instances in the data set. A technique for force feedback can also include providing a force feedback via a force feedback device as an interaction point interacts with the portion of the data instances.

17 Claims, 6 Drawing Sheets

(56) References Cited

U.S. PATENT DOCUMENTS

| | | |
|---|---|---|
| 2010/0023857 A1 | 1/2010 | Mahesh et al. |
| 2010/0271295 A1 | 10/2010 | Braun et al. |
| 2012/0103776 A1 | 5/2012 | Walker et al. |
| 2013/0264182 A1 | 10/2013 | Shen et al. |
| 2014/0320392 A1* | 10/2014 | Chizeck .................. G06F 3/016 345/156 |

FOREIGN PATENT DOCUMENTS

| | | |
|---|---|---|
| EP | 2410408 | 1/2012 |
| TW | 201021066 | 6/2010 |
| WO | WO-2012096666 A1 | 7/2012 |

OTHER PUBLICATIONS

Kahol, et al., "Cognitive Simulators for Medical Education and Training", Journal of Biomedical Informatics, vol. 42, No. 4, 2009, pp. 593-604.

Yu, et al., "Haptic Graphs for Blind Computer Users", Haptic Human-Computer Interaction Workshop, Glasgow University, 2000, 6 pages.

\* cited by examiner

FORCE FEEDBACK

BACKGROUND

Visual analytics may be used to explore data. Visual analytics may be conducted using a two dimension (2D) mouse pointing device. Using the 2D mouse pointing may inhibit a user from exploring a third dimension. A user of the 2D mouse pointer may need to focus on visual cues to determine if an object of interest has collided, e.g., touched and/or contacted, with the cursor along a third axis.

Visual analytics may also be conducted using a three dimensional (3D) active infrared proximity motion sensing pointer. A user of the 3D active infrared proximity motion sensing pointer may also need to focus on visual cues to determine if an object of interest has collided with the cursor along the third axis even though the 3D active infrared proximity motion sensing pointer may allow a user to explore a third dimension.

DETAILED DESCRIPTION

A force feedback system can include a force feedback device that applies force feedback to a user. A user of the force feedback device can physically feel a force. The force feedback can provide a user with information that may not be evident in visualized data. Force feedback can include a resistive force and/or a vibrating force. Force feedback can be used to navigate a data set that includes a plurality of data instances. The force feedback system can be used to guide a user in the exploration of the data set. The force feedback system can be used to identify patterns in a data set.

Navigating data can allow a user to draw insights from the data as the user navigates the data via force feedback. A resistive force can be applied to the force feedback device to convey to a user insight regarding the data, e.g., distribution of the data, patterns within the data, bounds of the data, existence of data instances, among other insights that can be drawn, Data navigation is further discussed in FIG. 4.

Guiding a user can enable a user to find points of interest in the data while maintaining the visual organization of the data. A user can be guided along a continuous path within a visual representation of the data. A user can be guided by providing a force feedback that corresponds to the continuous path, Guiding a user is further discussed in FIG. 5.

Force feedback can be used to identify a pattern in data. Identifying patterns in a data set can include providing repetitious force feedback via the force feedback device. The repetitious force feedback can indicate that a portion of data is associated with a pattern. Pattern identification is further discussed in FIG. 6.

Figure 1:
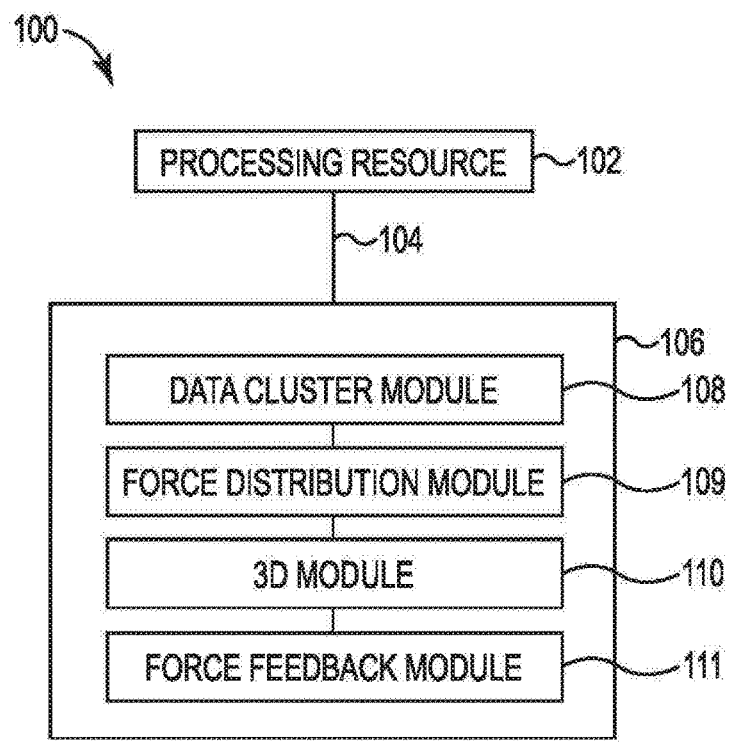
FIG. 1 illustrates a block diagram of an example of a computing device according to the present disclosure.

FIG. 1 illustrates a block diagram of an example of a computing device 100 according to the present disclosure. The computing device 100 can include a processing resource 102 connected to a memory resource 106, e.g., a computer-readable medium (CRM), machine readable medium (MRM), database, etc. The memory resource 106 can include a number of computing modules. The example of FIG. 1 shows a data cluster module 108, a force distribution module 109, a 3D module 110, and a force feedback module 111. As used herein, a computing module can include program code, e.g., computer executable instructions, hardware, firmware, and/or logic, but includes at least instructions executable by the processing resource 102, e.g., in the form of modules, to perform particular actions, tasks, and functions described in more detail herein in reference to FIG. 3, FIG. 4, FIG. 5, and FIG. 6. The processing resource 102 executing instructions associated with a particular module, e.g., modules 108, 109, 110, and 111, can function as an engine, such as the example engines shown in FIG. 2.

Figure 2:
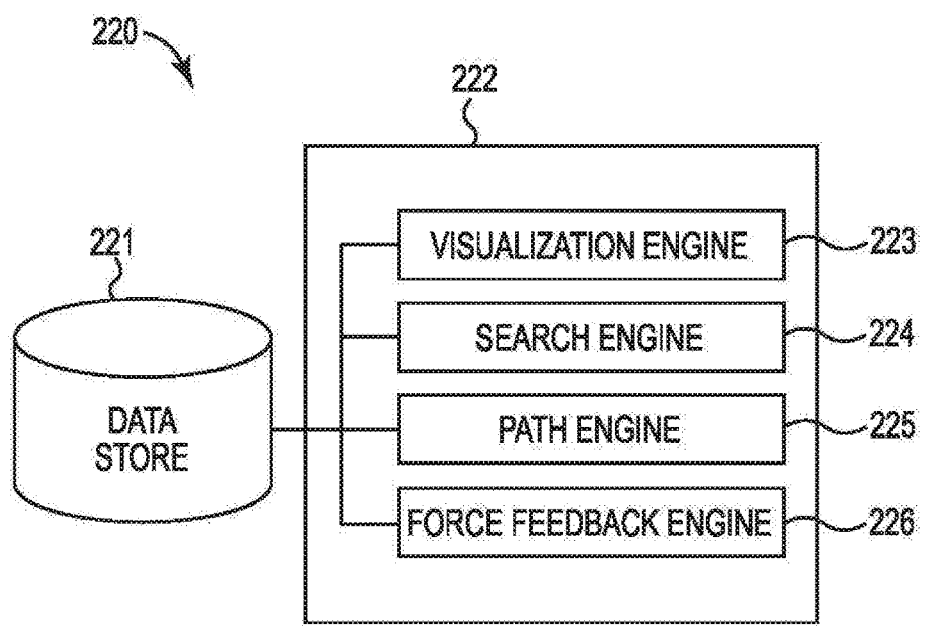
FIG. 2 illustrates a block diagram of an example of a system for providing force feedback according to the present disclosure.

FIG. 2 illustrates a block diagram of an example of a system 220 for providing force feedback according to the present disclosure. The system 220 can perform a number of functions and operations as described in FIG. 3, FIG. 4, FIG. 5, and FIG. 6, e.g., providing force feedback. The system 220 can include a data store 221 connected to a force feedback system 222. In this example the force feedback system 222 can include a number of computing engines. The example of FIG. 2 shows a visualization engine 223, a search engine 224, a path engine 225, and a force feedback engine 226. As used herein, a computing engine can include hardware firmware, logic, and/or executable instructions, but includes at least hardware e.g., a processor, executing instructions to perform particular actions, tasks and functions described in more detail herein in reference to FIG. 3, FIG. 4, FIG. 5, and FIG. 6.

The number of engines 223, 224, 225, and 226 shown in FIG. 2 and/or the number of modules 108, 109, 110, and 111 shown in FIG. 1 can be sub-engines/modules of other engines/modules and/or combined to perform particular actions, tasks, and functions within a particular system and/or computing device.

Figure 3:
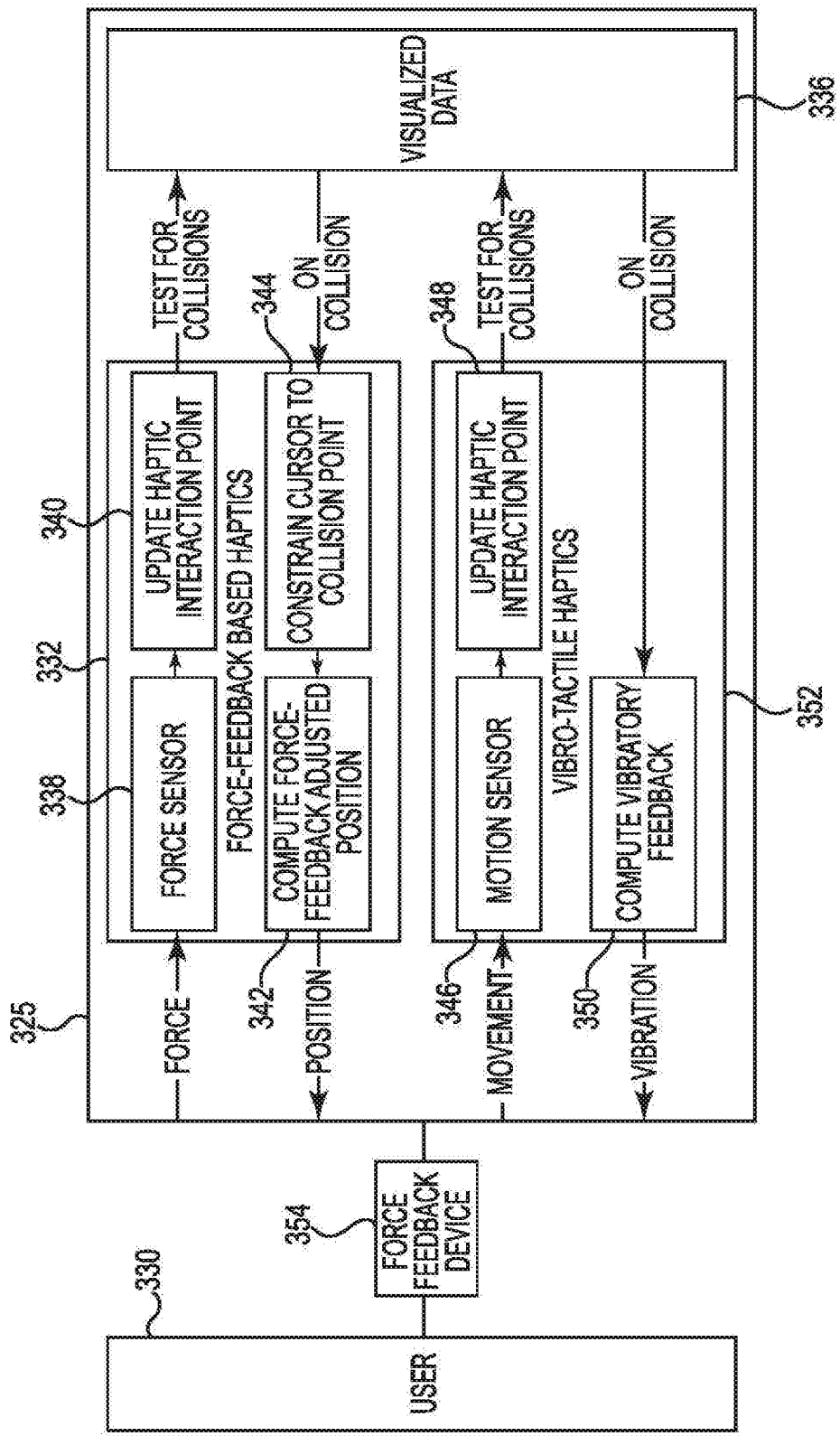
FIG. 3 illustrates a block diagram of an example of a system for providing force feedback to a user according to the present disclosure.

Further, the engines and/or modules described in connection with FIGS. 1 and 2 can be located in a single system and/or computing device or reside in separate distinct locations in a distributed computing environment, e.g., cloud computing environment. Embodiments are not limited to these examples, FIG. 3 illustrates a block diagram of an example of a system 325 for providing force feedback to a user according to the present disclosure. FIG. 3 includes a user 330, a force feedback device 354, and a force feedback system 325 that includes a force feedback based haptics module 332, a vibro-tactile haptics module 352, and visualized data 336. In a number of examples, the force feedback device 354 can include the force feedback based haptics module 332 and the vibro-tactile haptics module 352.

Haptics involves communication through touch. Haptics can involve force feedback and/or audio feedback, among other forms of touch oriented communications. Force feedback can include applying a force to a force feedback device and/or a vibration to a force feedback device.

A force feedback based haptics module 332 includes a force sensor module 338, an update haptic interaction point module 340, a computer force feedback adjusted position module 342, and a constrain cursor to collision point module 344. A vibro-tactile haptics module 352 includes a motion sensor module 346, an update haptic interaction point module 348, and a compute vibratory feedback module 350.

A user 330 can provide input to the force-feedback system via a force feedback device 354. A force feedback device 354 can include computer readable instructions and/or hardware that can be used to receive user input and update visualized data 336. A force feedback device 354 can be a joystick, a pointing device, and/or a keyboard, among other types of force feedback devices. A force feedback device 354 can associate an interaction point with the visualized data 336. An interaction point is further defined below.

In a number of examples, a force feedback device 354 can include a moving unit that moves based on a user's 330 interaction with the moving unit and/or the force feedback device 354. The moving unit can be internal to the force feedback device 354 and/or external to the force feedback device 354. The moving unit can include machine readable instructions and/or hardware. For example, the moving unit can be a sensor and/or a mechanical unit in the force feedback device 354, among other examples of a moving unit.

A force feedback device 354 can apply a force to the moving unit and as such can be said to apply a force to the user 330 that is controlling the force feedback device 354 and/or the moving unit. A force feedback device 354 can also receive a force and/or a movement from the user via the moving unit. That is, the force feedback device 354 can receive user input via the moving unit.

A force can include a magnitude, e.g., an intensity, and a direction. A force can include a resistive force and/or a vibrating force, among other types of forces that can be applied to a user via the force feedback device 354. As used herein, applying a force to a moving unit can also describe applying a force to the force feedback device 354. Applying a force to the feedback device 354 can also describe applying a force to the moving unit.

A resistive force can be a force of repulsion, a force of attraction, and/or a vibrating force. A force of repulsion can be, for example, a simulated magnetic force of repulsion. A force of repulsion is a force directed away from a point in the visualized data 336. A force can be directed away from the point in the visualized data 336 by correlating the point in the visualized data 336 with the interaction point and by constraining the force feedback device 354 from moving the interaction point towards the point in the visualized data 336.

A force of attraction can be, for example, a simulated magnetic force of attraction. A force of attraction is a force directed towards a point in the visualized data 336.

A vibrating force is a vibration that is applied to the force feedback device 354 and/or the moving unit in the force feedback device 354.

Visualized data 336 is the visualization or display of a model that is constructed using a data set which includes a number of data instances. In a number of examples, the visual model can be displayed on a display unit such as a monitor and/or a screen. A visual model can be a two dimensional (2D) model or a 3 dimensional model. More or less dimensions that those mentioned herein can be used to visualize data.

A visual model can include objects that represent the data set. For example, a first object can represent a first data instance and a second object can represent a second data instance. Displaying a visual model can include displaying the objects that form the model. As used herein, reference to an object can also include reference to one or more data instances that the object represents. Furthermore, reference to one or more data instances can also reference the object that represents the one or more data instances. For example, an interaction between an interaction point and a data instance can reference an interaction between the interaction point and/or an object that represents the data instance.

A user 330 can use the force feedback device 354 to update the visualized data 336. A use 330 can provide a force to and/or move the force feedback device 354 via the moving unit in the force feedback device 354. A force sensor module 338 can sense the force. The force-feedback based haptics module 332 can update an interaction point via the update haptic interaction point module 340.

An interaction point can be a location and/or an icon that is displayed in the visualized data 336. For example, an interaction point can be a cursor. An interaction point can associate a moving unit and/or a force feedback device 354 with a location in the visualized data 336. An interaction point is further defined in FIG. 4, FIG. 5, and FIG. 6.

A force feedback system can determine whether the interaction point has collided with an object in the visualized data 336. As used herein, a collision can describe a relationship between an interaction point and an object and/or a data instance in the object. For example, a collision can occur when an interaction point touches, interacts, and/or contacts an object and/or a data instance. If the force feedback system determines that a collision between an interaction point and a visualized object has occurred, then the force feedback device 354 can be constrained to the collision point by the constrain cursor to collision point module 344.

The compute force feedback adjusted position module 342 can compute a force. In a number of examples, the force can be proportional to the position of an interaction point in a force distribution that is associated with the visualized data 336. The compute force feedback adjusted position module 342 can cause the force feedback device 354 to apply the force.

The vibro-tactile haptics module 352 can receive user input via the motion sensor module 346. The motion sensor module 346 can sense a movement of the moving unit in the force feedback device 354. The vibro-tactile haptics module 352 can update the interaction point at the update haptic interaction point module 348. The vibro-tactile haptics module 352 can determine whether the interaction point has collided with an object. If the interaction point has collided with an object, then a vibration feedback is computed at the compute vibratory feedback module 350 and a vibration can be applied to the force feedback device 354. A collision between an object and the interaction point can occur when the interaction point comes into contact with the object as displayed in the visualized data 336.

A force feedback system can convey information regarding the visualized data 336 to a user 330 without modifying the visualized data 336. For example, a collision between an interaction point and an object in the visualized data 336 can be expressed to the user 330 via a vibration without portraying the collision in the visualized data 336. Without the force feedback system, the visualized data 336 would have to be modified to portray the collision to a user 330, for example, by modifying the visualized data to flash at the point of collision.

Figure 4:
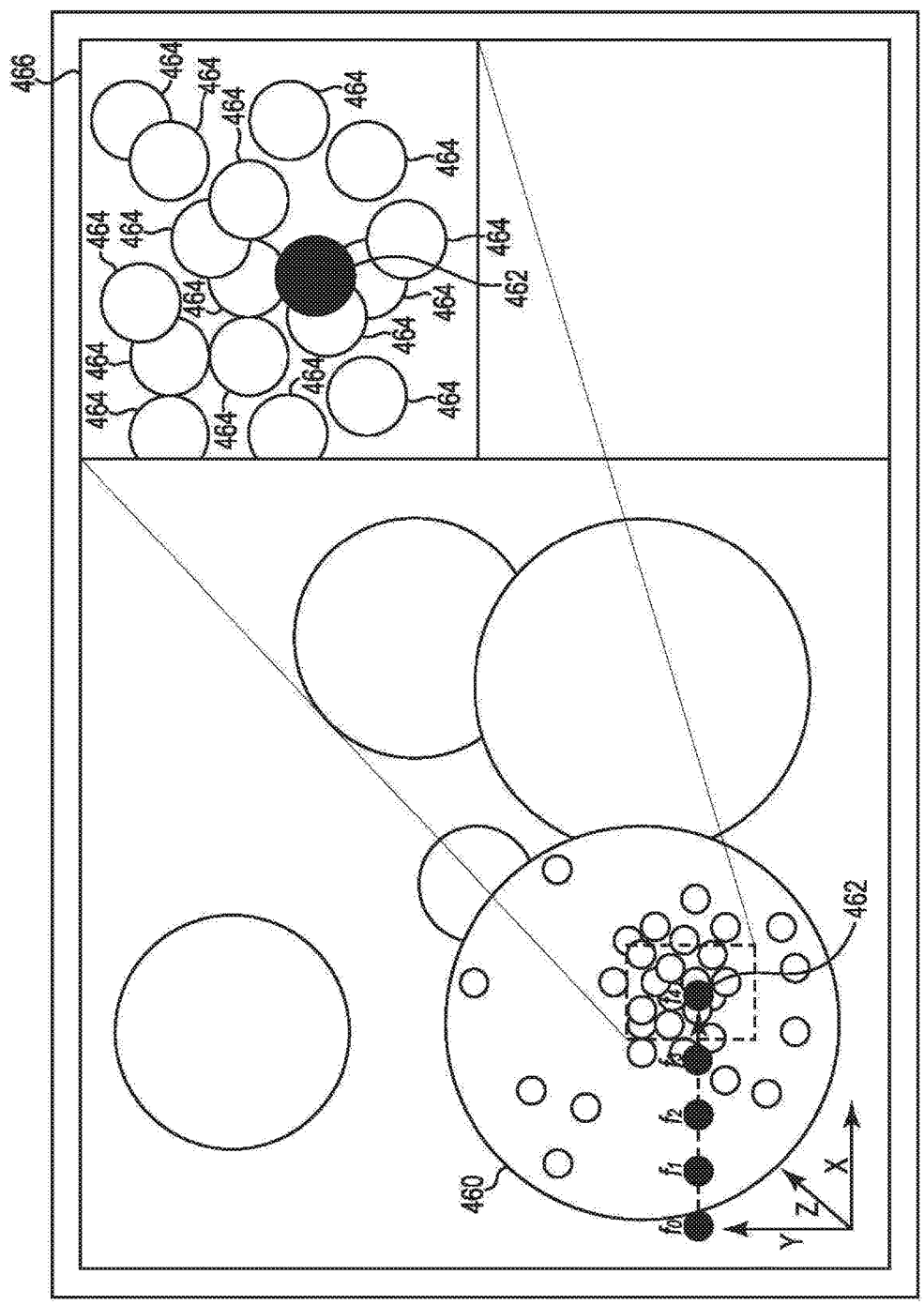
FIG. 4 illustrates a diagram of an example of aided navigation according to the present disclosure.

FIG. 4 illustrates a diagram of an example of aided navigation according to the present disclosure. FIG. 4 includes interaction point 462, object 460, and data instances 464. FIG. 4 is an example of visualized data 336 in FIG. 3. FIG. 4 also includes a zoomed-in view 466 of portion of object 460.

At data cluster module 108 in FIG. 1, a 3D model of a cluster of data instances 464 can be created. The data instances can constitute a data set. A cluster of data instances can be represented as a 3D object 460. Data instances 464 can include emails, documents, directories, accounts, and/or other types of data. A 3D object 460 can include abstracted bubble representations of the cluster of data instances 464. Each of the clusters can consist of non-uniformly distributed data instances that may or may not be visible to the user.

At force distribution module 109, the cluster of data instances 464 can be displayed as a 3D object whose force distribution matches that of the data density present in the cluster. For example, a viscosity distribution can be associated with the object 460. A force distribution can be a viscosity distribution, a magnetic distribution, and/or a vibration distribution among other types of distributions.

A viscosity distribution can simulate the resistance in a liquid and can be used to correlate the resistance in the liquid with a force. A viscosity in object 460 can increase as the concentration of data instances increases. At the 3D module 110, the interaction point in the 3D model can be associated with a position in the viscosity distribution. A viscosity distribution can be generated based on a concentration of data instances at various points in the object 460. A higher viscosity can correspond to a higher concentration of data instances.

A magnetic distribution can simulate a magnetic force that is associated with an object 460. A force proportional to the interaction point's 462 position in the object 460 can be applied. The interaction point's 462 position in the object 460 can be associated with a position in the magnetic distribution.

A vibration distribution can be used to apply a vibration force to a force feedback device when the interaction point 462 interacts with the data instances 464 in object 460.

Interaction point 462, as shown in FIG. 4, includes a representation of the interaction point 462 at a number of different times. The dotted line represents movement of interaction point 462. A first force (f0) can be applied to the force feedback device at a first time, a second force (f1) can be applied to the force feedback device at a second time, a third force (f2) can be applied to the force feedback device at a third time, a fourth force (f3) can be applied to the force feedback device at a fourth time, and a fifth force (f4) can be applied to the force feedback device at a fifth time. The applied forces can be based on the position of the interaction point 462 and the association of the position in the viscosity distribution.

At force feedback module 111, a force proportional to the force distribution that is associated with object 460 can be applied to the force feedback device. For example, a resistive force conveyed to a user via the force feedback device can increases as an interaction point 462 approaches a cluster of data instances. In a number of examples, at force feedback module 111, a vibration and/or a magnetic force can be conveyed to the user using the force feedback device.

A user can navigate the data instances 464 to identify clusters of data instances using the force feedback device. That is, a user can be aided in navigating the data instances 464.

In a number of examples, the visualized data can be modified such that a user can interact directly with the data instances 464 and/or with the object 460. For example, a force feedback device can vibrate when the interaction point 462 collides with one of the data instances 464 and/or a resistive force can be applied through the force feedback device proportional to the interaction point's 462 location in the object 460.

Figure 5:
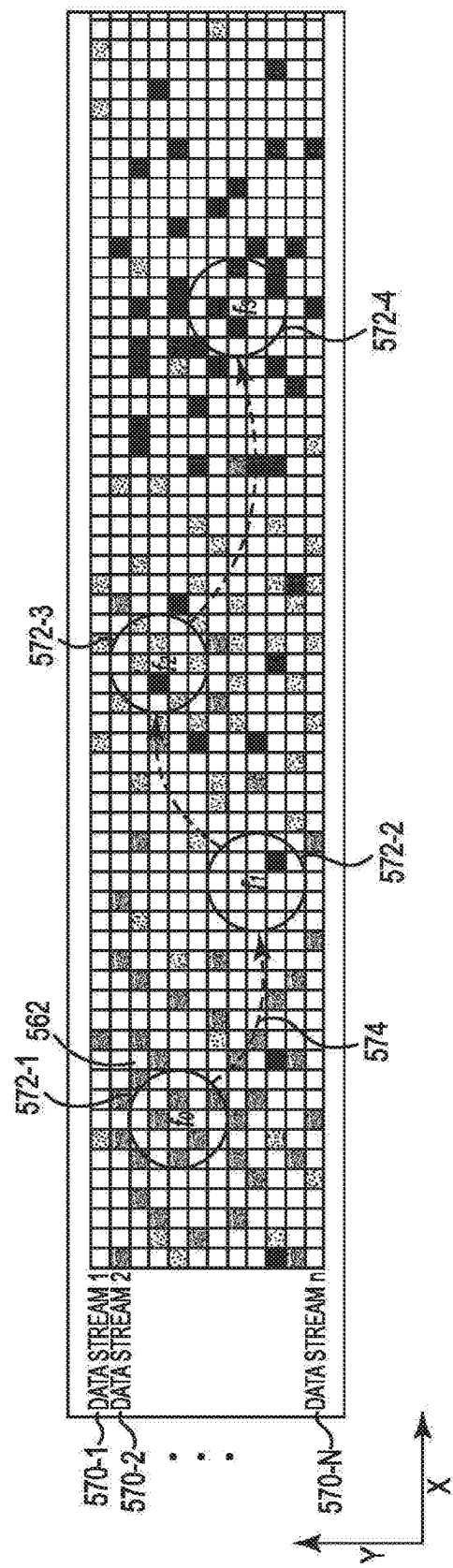
FIG. 5 illustrates a diagram of an example of guided exploration according to the present disclosure.

FIG. 5 illustrates a diagram of an example of guided exploration according to the present disclosure. FIG. 5 includes a data stream 570-1, a data stream 570-2, . . . , and a data stream 570-N, e.g., referred to generally as data streams 570, an interaction point 562, feedback point 572-1, feedback point 572-2, feedback point 572-3, and feedback point 572-4, e.g., referred to generally as feedback points 572.

In visualization engine 223, a data set that includes the data streams 570 can be included in a visual model. A visual model can include a 2D model and/or a 3D model. FIG. 5 is a visual representation of a 2D model.

Figure 6:
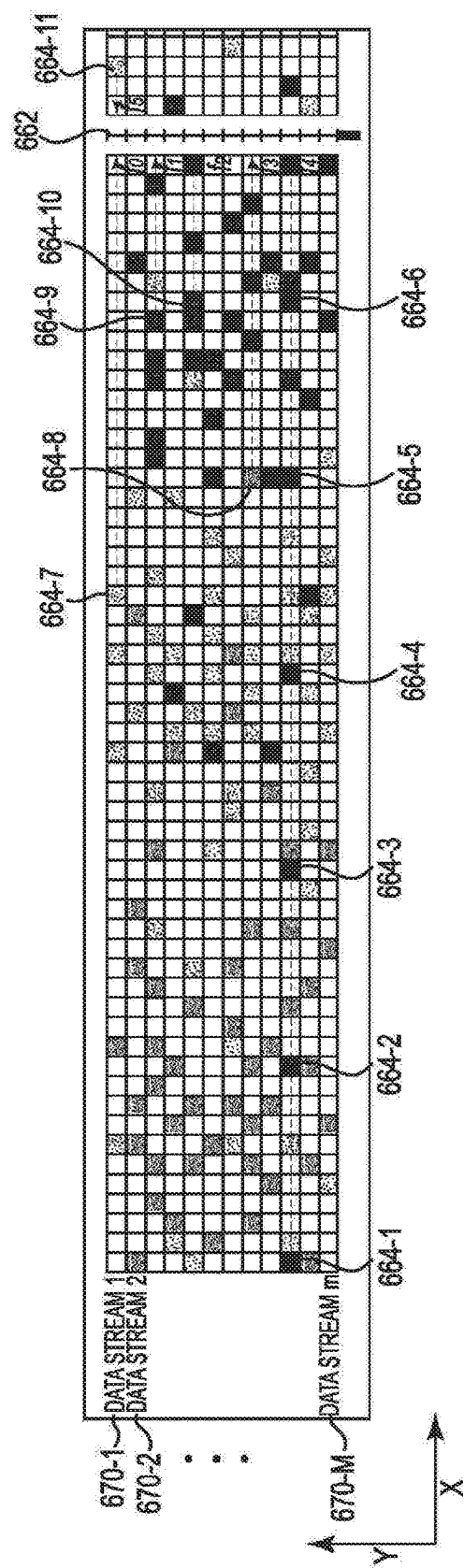
FIG. 6 illustrates a diagram of an example of pattern identification according to the present disclosure.

In FIG. 5, the y-axis represents the data streams 570 and the x-axis represents a plurality of discrete intervals, e.g., discrete time intervals. For example, the data stream 570-1 can include a plurality of data instances that are visually represented along an x-axis based on a time that is associated with each of the plurality of data instances. For example, a data stream 570-1 can include emails sent from a first email address. The data instances in the data stream 570-1 can be individual emails. In FIG. 5 and FIG. 6, the data instances are depicted as squares.

Time can progress from left to right as displayed in FIG. 5. That is, the data instances oriented on the left side of the data streams 570 are older than the data instances oriented on the right side of the data stream 570.

In a number of examples, the shading of the data instances can represent an attribute of the data instances such as frequency, time of day, and email type, among other attributes. In search engine 224, a query can be executed to select a portion of the data instances. For example, a query can be used to identify all emails that have a first user as a recipient of the email. All emails that have a first user as a recipient of the email can be associated with a same gray scale value in the visualized data.

A feedback point can be established for each of the results of the query and/or for clusters of the results of the query. For example, feedback point 572-1 can represent a first cluster from the results, feedback point 572-2 can represent a second cluster from the results, feedback point 572-3 can represent a third cluster from the results, feedback point 572-4 can represent a fourth cluster from the results.

At path engine 225, a continuous path can be created and/or displayed. The continuous path can be included in the 2D model. In FIG. 5, the continuous path is shown as a dotted line that connects the feedback points 572. The continuous path can go through the portion of data instances.

At force feedback engine 226, force feedback can be provided when the interaction point 562 interacts with the continuous path and/or the feedback points 572. Force feedback can be provided by applying a force to a force feedback device. The force feedback can be a resistive force.

The magnitude of the force feedback can correspond to the interaction point's 562 location relative to the continuous path and/or the feedback points 572. A resistive force can include a magnetic force of attraction or a magnetic force or repulsion, among other types of forces that can be applied using the force feedback device.

A magnetic force of attraction can include applying a force towards the continuous path. A force as applied to the force feedback device can move the interaction point 562 towards the continuous path when no other forces are applied on the force feedback device. That is, a user will feel that the force feedback device is being pulled towards the continuous path.

A magnetic force of attraction can be used to guide a user to the positive results from the query. For example, if a continuous path identifies emails on which the first email address was copied, then a magnetic force of attraction will provide a force that will lead a user to the identified emails.

A magnetic force of repulsion can include applying a force away from the continuous path. The force as applied to the force feedback device can move the interaction point 562 away from the continuous path when no other forces are applied on the force feedback device. The user will feel that the force feedback device is being pushed away from the continuous path. The resistive force away from the continuous path increases as the distance between the interaction point and the continuous path decreases.

A magnetic force of repulsion can be used to guide a user away from the positive results from the query. For example, if a continuous path identifies emails on which the first email address was copied, then a magnetic force of repulsion will provide a force that will lead a user away from the identified emails and towards emails on which the first email address was not copied.

In a number of examples, a vibrating force can be applied to the force feedback device when an interaction point that is associated with the force feedback device interacts with the continuous path. A vibrating force can identify positive results.

FIG. 6 illustrates a diagram of an example of pattern identification according to the present disclosure. FIG. 6 includes a data stream 670-1, a data stream 670-2, . . . , and a data stream 760-M, e.g., referred to generally as data streams 670, that are analogous to data streams 570 in FIG. 5.

FIG. 6 is a representation of a 2D model of a number of data instance in data set that is composed of data streams 670. In a number of examples, the data set can be represented in a 3D model. The 2D model and the 3D model are visual models. The data streams are oriented along the y-axis while the x-axis gives time.

In a number of examples, a portion of the data instances can be selected from the data streams 670. For example, data instance 664-1, data instance 664-2, data instance 664-3, data instance 664-4, data instance 664-5, data instance 664-6, data instance 664-7, data instance 664-8, data instance 664-9, data instance 664-10, and data instance 664-11, e.g., referred to generally as the portion of data instances 664, can be selected. The portion of data instances 664 can be selected based on the results of a query conducted by a user. For example, a query can request all emails that are copied to more than 10 different emails.

In FIG. 6, an interaction point 662 is a vertical bar that can move to the left and/or to the right along the x-axis. Force feedback can be provided to a user via a force feedback device, as the interaction point 662 moves along the x-axis. The force feedback can be provided when the interaction point 662 interacts with any portion of the visual representation of the data instances 664. For example, force feedback can be provided when the interaction point 662 collides with data instance 664-11.

A type of force feedback and/or magnitude of force feedback can be associated with an interaction between an interaction point and an object. For example, if data instance 664-7 is an email that has been copied to 10 different email addresses and data instance 664-11 is an email that has been copied to 15 different email addresses, then a force feedback associated with an interaction between interaction point and the data instance 664-11 can have a greater force than the a force feedback associated with an interaction between interaction point and the data instance 664-7.

In a number of examples, if the interaction point 662 collides with data instance 664-8 and data instance 664-5 simultaneously, then a force feedback can be the product of a first force feedback associated with data instance 664-8 and a second force feedback associated with data instance 664-5. For example, the first force feedback and the second force feedback can be averaged or summed to determine the appropriate force feedback to apply to the force feedback device.

In a number of examples, a query can be used to select a number of different characteristics that are associated with the data instances. Each of the different characteristics can be associated with a different value in the gray scale. In a number of examples, each of the different characteristics can be associated with a different color.

A query can be used to search for data instances with any of the three different variables. For example, if the data instances are patient records, then the query can search for patients that have a specific potassium level characteristic, an age characteristic, and/or a heart disease characteristic.

For example, the query can be used to select patients that have potassium levels that is less than 3.5, patients that are 55-60 years old, and patients that have a prior history of heart disease. Each of the characteristics can be associated with a color and/or a gray scale value.

In a number of examples, each of the characteristics can be associated with a different force feedback response. For example, a collision between the interaction point 662 and a data instance 664-7 that represents a patient record can results in a force feedback $f_0$. The force feedback $f_0$ can be different than force feedback $f_1$. Force feedback $f_1$ can be a force feedback that is applied as a result of a collision between the interaction point 662 and the data instance 664-9.

Selecting a number of data instances with different characteristics and associating a type and/or an intensity of force feedback can allow a user to observe the different characteristics without relying on the visual representation of the data instances. The force feedback can be used to detect repetitive patterns. A repetitive pattern is shown in FIG. 6 in data instance 664-1, data instance 664-2, data instance 664-3, data instance 664-4, data instance 664-5, and data instance 664-6.

A repetitive pattern can include a distance between selected data instances. For example data instance 664-1 can have a same distance from data instance 664-2 as data instance 664-2 has from data instance 664-3. A distance as relating to the x-axis in FIG. 6 can indicate a same time interval between two data instances. For example, a pattern can occur when data instance 664-1, data instance 664-2, data instance 664-3, data instance 664-4, data instance 664-5, and data instance 664-6 are equally spaced along the x-axis.

A repetitive force feedback can include using a same force with a same direction and/or a same level of intensity. The same force with a same direction can be used every time a collision between the interaction point 662 and one of data instance 664-1, data instance 664-2, data instance 664-3, data instance 664-4, data instance 664-5, and data instance 664-6 occurs.

The repetitious force feedback can alert a user of the force feedback device that the portion of the data instances corresponds to a pattern associated with the plurality of data instances in the data stream. That is, a user can identify patterns within data streams using the force feedback rather as opposed to visually. Visual pattern identification can be problematic in large data sets with a large number of data streams because a user may be unable to visually identify patterns. However, patterns may be identified easier using force feedback as oppose to visual identification.

The user can be allowed to traverse the data instances by moving the interaction point 662 to the left and/or to the right, as oriented in relation to FIG. 6. In a number of examples, the interaction point 662 can be stationary and the data instances in the data streams 670 can move to the left and/or to the right as oriented in FIG. 6 along the x-axis. Moving the interaction point 662 and/or the data streams 670 to the left and/or to the right along the x-axis can include forwarding the data streams 670 and/or reversing the data streams 670.

Figure 7:
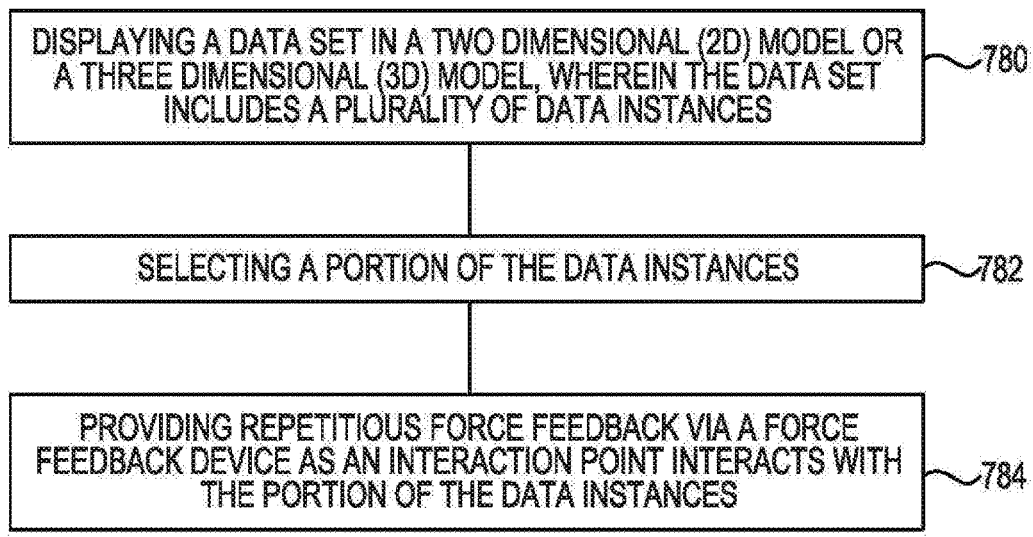
FIG. 7 illustrates a flow diagram of an example of a method for force feedback according to the present disclosure.

FIG. 7 illustrates a flow diagram of an example of a method for force feedback according to the present disclosure. At 780, a data set in a 2D model can or a 3D model can be displayed. The data set can include a number of data streams that can include a plurality of data instances.

At 782, a portion of the data instances from the plurality of data instances can be selected. The selection can be based on a query, a filter, a rule, and/or any other means of selecting the plurality of instances.

At 784, a repetitious force feedback can be provided via a force feedback device as an interaction point interacts with the portion of the data instances. An interaction can include a collision between the interaction point and one or more of the data instances. A repetitious force feedback can include providing force feedback repetitiously over time.

In a number of examples, the repetitious force feedback can alert a user of the force feedback device that the portion of the data instances corresponds to a pattern associated with the plurality of data instances in the data stream. A pattern can include a characteristic of the data instances that is manifest in a plurality of the data instances. For example, a pattern can include emails that are sent to a first email address and/or to a second email address.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing, Elements shown in the various figures herein can be added, exchanged, and/or eliminated so as to provide a number of additional examples of the present disclosure. As used herein, the designators "N" and "M", among others, indicate that a number of the particular feature so designated can be included with a number of examples of the present disclosure. In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A non-transitory machine-readable medium storing instructions for force feedback executable by a machine to cause the machine to:
    display, on a display unit, a visual representation of a data set including a plurality of data instances in a graph that has an x-axis and a y-axis, wherein the y-axis of the graph shows different data streams of the plurality of data instances, and the x-axis of the graph shows a time line of the plurality of data instances;
    in response to a query for a certain type of data instances, select the certain type of data instances from the plurality of data instances based on an execution of the query;
    highlight the selected data instances among the plurality of data instances displayed in the graph;
    display, on the display unit, an interaction point, wherein the interaction point is movable by a feedback device along the time line of the graph; and
    provide a feedback force on the feedback device when the interaction point is moved along the time line of the graph and comes in contact with the highlighted data instances in the graph, wherein the feedback force on the feedback device varies proportionally to a total number of the highlighted data instances that the interaction point comes in contact with.

2. The non-transitory machine-readable medium of claim 1, wherein the feedback force is a vibrating force applied to the feedback device based on a relationship between the interaction point and the total number of the highlighted data instances.

3. The non-transitory machine-readable medium of claim 1, wherein the graph is a three-dimensional (3D) visual model.

4. The non-transitory machine-readable medium of claim 2, wherein the feedback force corresponds to a level of viscosity associated with a concentration of the highlighted data instances in the graph.

5. The non-transitory machine-readable medium of claim 4, wherein a higher level of viscosity corresponds to a higher concentration of the highlighted data instances.

6. The non-transitory machine-readable medium of claim 5, wherein the instructions are executable to increase the feedback force applied to the feedback device as the level of viscosity increases.

7. A system for force feedback comprising a processing resource in communication with a non-transitory machine readable medium having instructions executed by the processing resource to cause the processing resource to:
    display, on a display unit, a visual representation of a plurality of data instances in a graph having an x-axis and a y-axis, wherein the y-axis of the graph shows different data streams of the plurality of data instances, and the x-axis of the graph shows a time line of the plurality of data instances;
    select a portion of the plurality of data instances in response to a query for a certain type of data instances;
    highlight the selected data instances among the plurality of data instances displayed in the graph;

display, on the display unit, an interaction point, wherein the interaction point is movable by a force feedback device along the time line of the graph; and provide a feedback force on the force feedback device when the interaction point is moved along the time line of the graph and comes in contact with the highlighted data instances in the graph, wherein the feedback force on the force feedback device varies proportionally to a total number of the highlighted data instances that the interaction point comes in contact with.

8. The system of claim 7, wherein the instructions are executable to cause the processing resource to create and display a continuous path within the graph that connects feedback points through the highlighted data instances and wherein the feedback force is a resistive force applied on the force feedback device as the interaction point associated with the force feedback device follows the continuous path.

9. The system of claim 8, wherein the resistive force is a simulated magnetic force of repulsion away from the continuous path.

10. The system of claim 9, wherein the instructions are executable to cause the processing resource to increase the resistive force on the force feedback device as the total number of highlighted data instances that the interaction point comes in contact with increases along the continuous path.

11. The system of claim 8, wherein the resistive force is a simulated magnetic force of attraction towards the continuous path.

12. The system of claim 11, wherein the instructions are executable to cause the processing resource to increase the resistive force towards the continuous path as a distance between the interaction point and the continuous path decreases.

13. The system of claim 7, wherein the graph is a two-dimensional (2D) model or a three-dimensional (3D) model.

14. A method for force feedback comprising:

displaying, on a display unit, a visual representation of a data set including a plurality of data instances in a graph that has an x-axis and a y-axis, wherein the y-axis of the graph shows different data streams of the plurality of data instances, and the x-axis of the graph shows a time line of the plurality of data instances;

displaying, on the display unit, an interaction point, wherein the interaction point is movable by a feedback device along the time line of the graph;

selecting, by the processor, a portion of the plurality of data instances in response to a query for a certain type of data instances;

highlight the selected data instances among the plurality of data instances displayed in the graph; and providing, by the processor, a feedback force on the force feedback device as the interaction point is moved along the time line of the graph and comes in contact with the highlighted data instances in the graph, wherein the feedback force on the force feedback device varies proportionally to a total number of the highlighted data instances that the interaction point comes in contact with.

15. The method of claim 14, wherein the feedback force alerts a user of the force feedback device that the highlighted data instances correspond to a pattern associated with the plurality of data instances in the data set.

16. The method of claim 14, wherein the feedback force corresponds to a level of viscosity associated with a concentration of the highlighted data instances and wherein a higher level of viscosity corresponds to a higher concentration of the highlighted data instances.

17. The method of claim 16, further comprising: increasing the feedback force on the force feedback device as the level of viscosity increases.

* * * * *